United States Patent [19]

Ryan

[11] 3,844,117

[45] Oct. 29, 1974

[54] POSITIVE DISPLACEMENT BRAYTON CYCLE ROTARY ENGINE

[76] Inventor: Ted L. Ryan, 703 Jordan Ln., Huntsville, Ala. 35805

[22] Filed: Aug. 4, 1972

[21] Appl. No.: 278,017

[52] U.S. Cl................. 60/39.61, 123/8.23, 418/12
[51] Int. Cl. ............................................. F02c 5/02
[58] Field of Search...................... 60/39.61; 418/12; 123/8.23

[56] References Cited
UNITED STATES PATENTS

| | | | |
|---|---|---|---|
| 660,129 | 10/1900 | Standish............................. | 60/39.61 |
| 821,603 | 5/1906 | Artibee................................. | 418/12 |
| 1,116,471 | 11/1914 | Neumeyer...................... | 60/39.61 X |
| 1,147,428 | 7/1915 | Peterson........................ | 123/8.23 X |
| 2,248,639 | 7/1941 | Miksits............................... | 60/39.61 |
| 2,447,929 | 8/1948 | Berry............................. | 60/39.61 X |
| 2,511,441 | 6/1950 | Loubiere....................... | 123/8.23 X |
| 3,707,073 | 12/1972 | Bernstein...................... | 418/12 |

FOREIGN PATENTS OR APPLICATIONS

| | | | |
|---|---|---|---|
| 580,771 | 9/1946 | Great Britain..................... | 123/8.23 |

*Primary Examiner*—Clarence R. Gordon

[57] ABSTRACT

A rotary engine employing a positive displacement rotary compressor, an evaporative type fuel mixing chamber which mixes compressed air with fuel, a downstream combustion chamber, and a positive displacement rotary expander driven by expanding combustion gases and which in turn drives the compressor and provides work output.

8 Claims, 8 Drawing Figures

3,844,117

POSITIVE DISPLACEMENT BRAYTON CYCLE ROTARY ENGINE

BACKGROUND OF THE INVENTION

Known positive displacement rotary engines operate on the Otto or Diesel power cycles. An Otto cycle rotary engine operates in the same manner as the Otto cycle reciprocating engine by taking in a charge of vaporized fuel and air at atmospheric pressure, compressing the charge, igniting the charge with an electrical discharge, burning the fuel at essentially constant volume, expanding the combustion products to produce work, exhausting the combustion products to the atmosphere and then repeating the cycle. The Diesel differs in the respect that fuel is injected into the air after it is compressed and is ignited by the heat of compression of the air.

It is important to note two things about the Otto and Diesel engines. The first is that both require quite high fuel to air ratios and the second is that the combustion process is not continuous, but takes place over a small portion of the cycle with an isolated fuel-air charge. The fuel air ratio for Otto and Diesel cycle engines is such that engines operating on these cycles produce large amounts of undesirable air pollutants as compared to engines operating on the Brayton or Rankine power cycles.

The gas turbine engines are rotary engines which operate on the Brayton cycle but are not positive displacement engines. Gas turbines depend upon the changes in momentum of high velocity air and combustion gas streams to compress the air and to produce torque. Present gas turbine engines employ two types of compressors, axial flow or centrifugal, for compressing the air and employ an axial flow turbine for producing torque from the hot combustion products.

Gas turbine engines have three characteristics which are undesirable for automotive applications. One, they do not produce high torques at low power settings, two, their rotational speed can only be varied over a small operating range as compared to present automotive engines and, three, gas turbines require rotational rates as much as five times present automotive engines, resulting in excessively high cost engines.

SUMMARY OF THE INVENTION

The present invention overcomes the aforesaid undesirable characteristics of prior Otto, Diesel, and Brayton cycle rotary engines and provides a new, efficient and cleaner running engine. In doing so it, for example, provides devices which constitute improved rotary compressors, pumps, expanders and fluid motors.

In accordance with the present invention, a continuous flow of pressurized air and fuel under pressure are supplied to a combustion chamber where continuous combustion occurs at constant pressure. The resulting combustion gases are mixed with added air and then continuously delivered to a multi-stage rotary expander where the expanding gases produce torque by expanding against the area of the positive displacement rotary lobes of expander. The expander then drives the compressor and fuel pump which supply the combustion chamber and provide a shaft output for performing work.

GENERAL DESCRIPTION OF PREFERRED EMBODIMENT OF THE INVENTION

Figure 1:
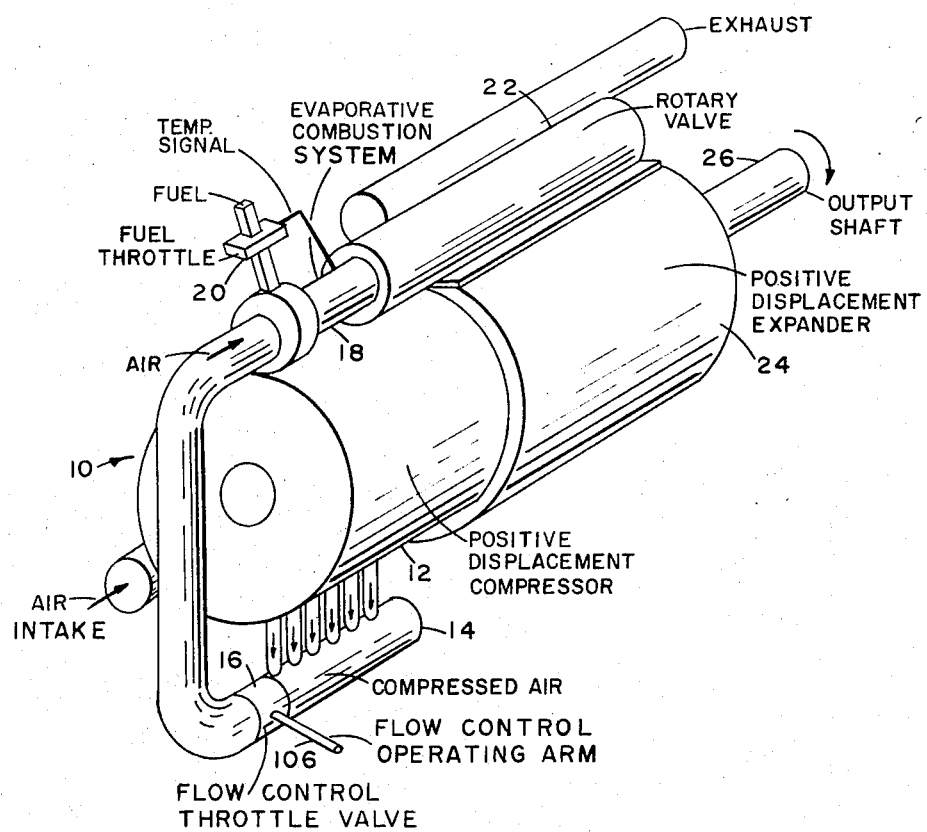
FIG. 1 is a pictorial view illustrating the arrangement of components of an engine constructed in accordance with the invention.

FIG. 1 generally illustrates the arrangement of the basic components of engine 10. Positive displacement rotary compressor 12 compresses air which is fed through air duct 14 and flow control throttle valve or valve assembly 16 to combustion system 18 where it is mixed with fuel supplied through temperature control fuel throttle assembly 20 and burned. The burning gases are mixed with added air and then supplied through rotary valve assembly 22 to drive a multistage, positive displacement, rotary expander 24. Rotary expander 24 in turn drives compressor 12 and a fuel pump, not shown, and provides a useful mechanical output on shaft 26. In this fashion, there is provided not only an extremely efficient engine but also relatively clean exhaust products.

Considering now the invention in greater detail the basic elements of the illustrated engine will be separately considered.

COMPRESSOR

Figure 2:
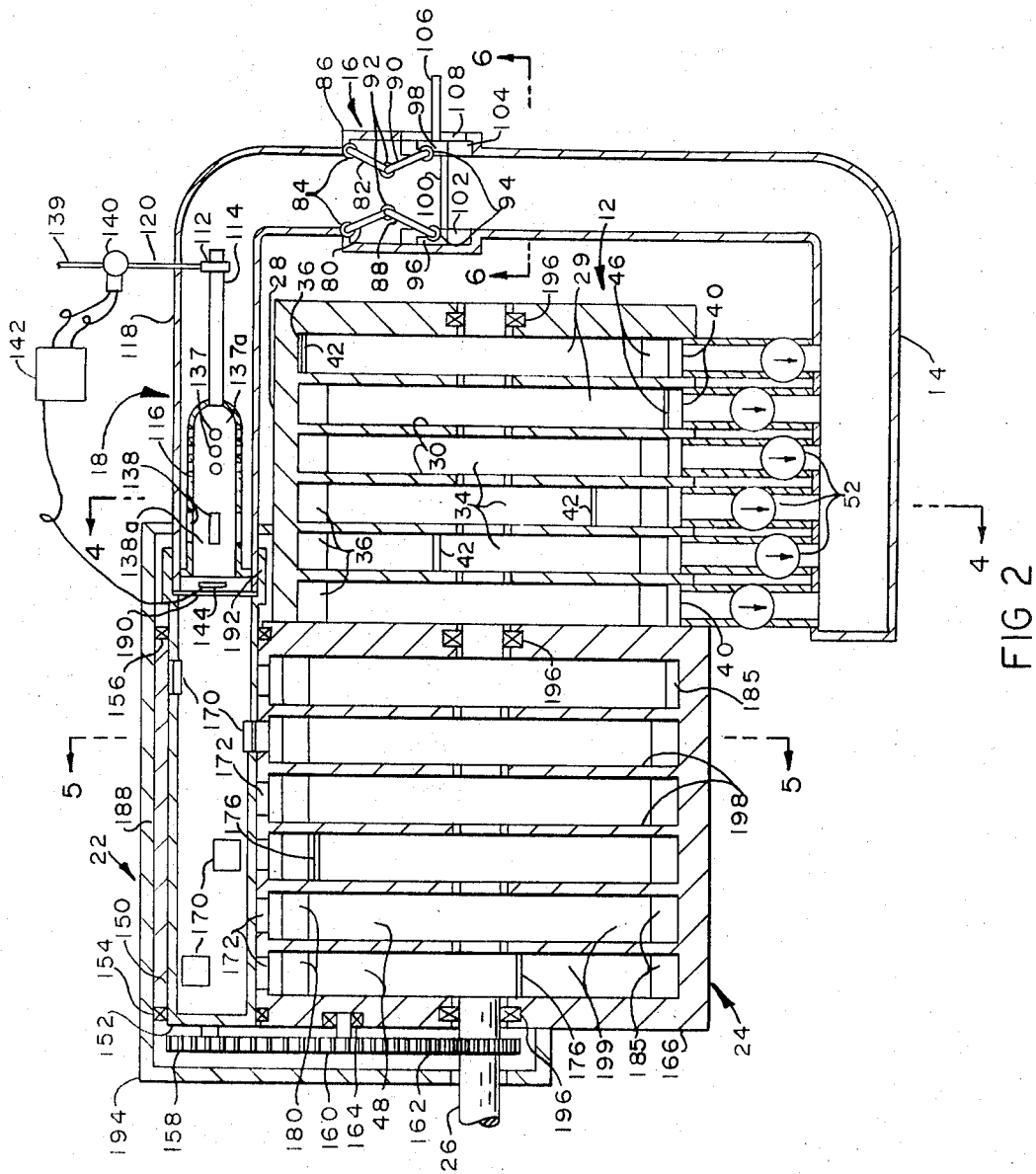
FIG. 2 is a longitudinal side elevational view, in section, of an embodiment of the invention.
Figure 3:
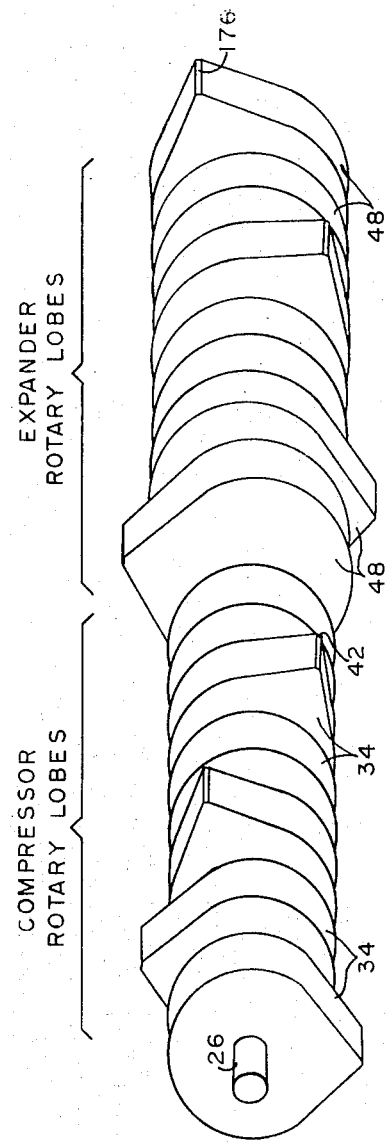
FIG. 3 is a pictorial view of a combined compressor-expander rotor assembly employed in the engine.
Figure 4:
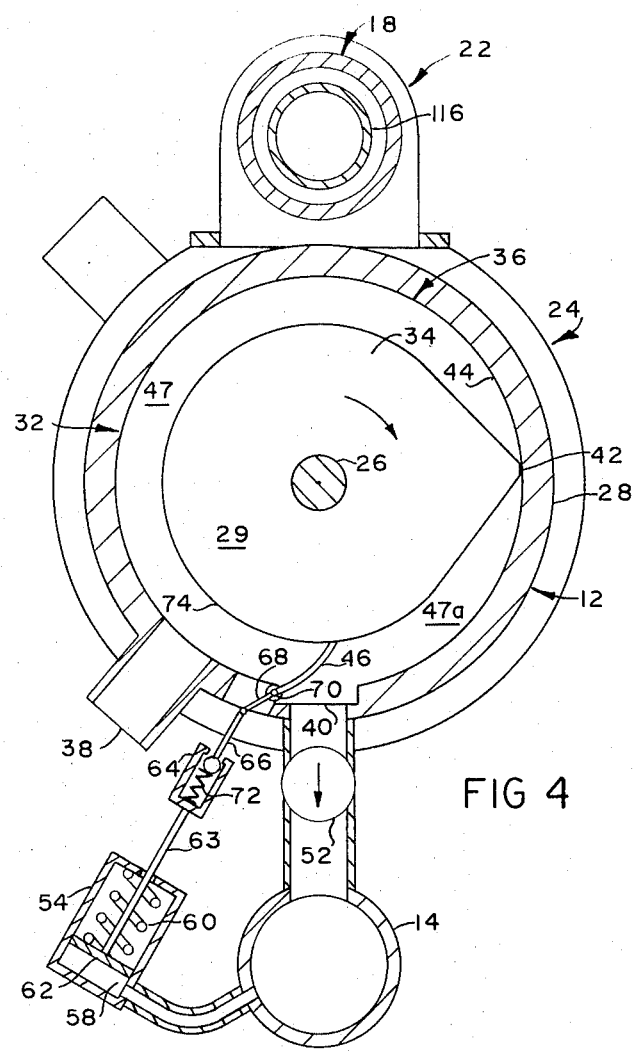
FIG. 4 is a sectional view along the lines 4—4 of FIG. 2 illustrating one of the compressor stages of the engine.

Compressor 12, illustrated in FIGS. 2 and 4, is enclosed by compressor housing 28 and it consists of six compressor stages. Individual compressor stages 29 are separated by housing partitions 30 to form six cylindrical cavities 32 in which six compressor rotary lobes 34 rotate. Thus, compressor housing 28, compressor housing partitions 30 and the six rotary lobes 34 form six sealed annular regions (or spaces) 36. Each annular region 36 has a single intake port 38 and a single exhaust port 40. Each compressor rotary lobe tip 42 seals against the outer wall 44 of an annular space 36. In cooperation with flow restricting flap 46 a lobe tip 42 and a wall 44 separates each annular space 36 into two regions 47 and 47a for the greater portion of travel of each compressor rotary lobe 34 through each revolution of operation. As will be seen from FIGS. 2 and 3, which show a common shaft 26 on which both compressor lobes 34 and expander lobes 48 are mounted, the lobe tips are staggered and are equally spaced at 60° intervals. In this manner there are thus six compressed air pulses (also power impulses) per revolution to produce a substantially continuous flow of air output into air duct 14.

Air intake into each compressor stage 29 is via port 38 (FIG. 4) which is in communication with that portion 47 of an annular space 36 which begins at flow restricting flap 46 and proceeds in the direction of rotation of rotary lobe 34, clockwise as shown in FIG. 4, and ends at rotary lobe tip 42. The previous charge of air is sealed and compressed in that portion 47a of a compressor annular space 36 that begins with rotary lobe tip 42 and proceeds in the direction of rotation of rotary lobe 34, clockwise, to flow restricting flap 46. This charge increases in pressure and temperature as rotary lobe 34 rotates clockwise until sufficient pressure is reached to open compressor check valve 52. This opening allows this compressed air charge to flow through port 40 and check valve 52 into engine air duct 14.

Compressor check valve 52 prevents back flow from engine air duct 14 to compressor annular space 36 during periods when the pressure in a particular compressor stage is less than in engine air duct 14. The maximum pressure in engine air duct 14 is controlled by engine air duct pressure control cylinders 54. As shown in FIG. 4, the pressure in air duct 14 is coupled to each of the pressure chambers 58. Thus with the pressure in engine air duct 14 below a predetermined pressure, a pressure controlled by a spring 60, piston 62 of pressure control cylinder 54, connecting rod 63, cylinder 64, link 66 and rod 68, is forced downward by means of spring 60 and flow restricting flap 46 is sealed against the outer surface of compressor rotary lobe 34. Pressure control is accomplished as follows. Flow restricting flap actuating link 66 and rod 68 are connected and pivot on pivot 70 and rod 68 and link 66 are rotatably connected to enable this action. At a predetermined pressure in engine air duct 14 the force of pressure control spring 60 is overcome and pressure control piston 62 is moved upward, and pressure control piston connecting rod 63, and flow restricting flap actuating cylinder 64 are urged upward, compressing flow restricting flap actuating spring 72 which urges link 66 upward causing rod 68 and flow restricting flap 46 to rotate clockwise about pivot 70. The rotation of flow restricting flap 46 separates it from the outer surface 74 of compressor lobe 34 and thereby allows part of the air charge about to be compressed in annular space 36 to flow past flap 46 reducing the amount of air which will flow into engine air duct 14 and thereby reducing the pressure in air duct 14.

When the pressure in engine air duct 14 is reduced to a predetermined value, the reverse process occurs and air duct pressure control cylinder 54 again causes flow restricting flap 46 to seal against the outer surface 74 of rotary lobe 34.

In the manner just described, the air flow delivered by compressor 12 is regulated and matched to the demand for air flow within desired upper and lower pressure limits at all power level settings and speeds of engine 10.

FLOW CONTROL THROTTLE VALVE

Figure 6:
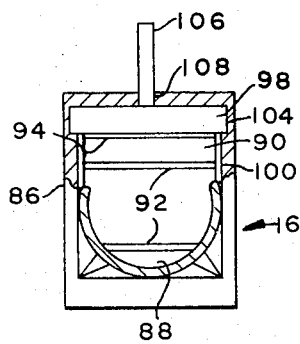
FIG. 6 is a sectional view partly broken away along the lines 6—6 of FIG. 2 illustrating the construction of the flow control throttle valve of the engine.

The volume of air flow from the output of compressor 12 to combustion system 18 is controlled by flow control throttle valve or valve assembly 16. Flow control throttle valve 16 is positioned within a section of air duct 14 between compressor 12 and the inlet of combustion system 18. It includes two diverging plates 80 and 82 which are rotatably mounted on one edge by pins 84 on housing 86 of valve assembly 16. Converging plates 88 and 90 are rotatably attached to the opposite edges of diverging plates 80 and 82, respectively, by two connecting pins 92. Converging plates 88 and 90 are rotatably attached by pins 94 to slide blocks 96 and 98. Slide blocks 96 and 98 are in turn interconnected by shaft 100 and as can be best seen in FIG. 2, the slide blocks are movably fitted into slide block recesses 102 and 104 and are allowed to move back and forth in a direction perpendicular to the plane of the drawing in FIG. 6. Diverging plates 80 and 82 and converging plates 88 and 90 extend the full width of housing 86 of throttle valve assembly 16 and form a movable seal with the sides of housing 86. Connecting shaft 100 rigidly connects slide blocks 96 and 98 such that a displacement of one of the slide blocks 96 or 98, results in an equal and opposite parallel displacement of the other slide block in the same direction. The position and movement of the slide blocks is controlled by applying an operating force to flow control operating arm 106. Arm 106 is rigidly attached to slide blocks 96 and 98 and is allowed to move, as shown, in valve slot 108. The area of valve slot 108 is suitably sealed to prevent leakage of the pressurized air from valve assembly 16.

Flow control throttle valve 16 controls the pressure and flow rate of air supplied to the engine combustion system and rotary expander 24. The power output of the rotary expander 24 is a direct function of the pressure of the air supplied to it. The control throttle valve 16 by controlling the expander pressure controls the engine power output.

COMBUSTION SYSTEM

Figure 7:
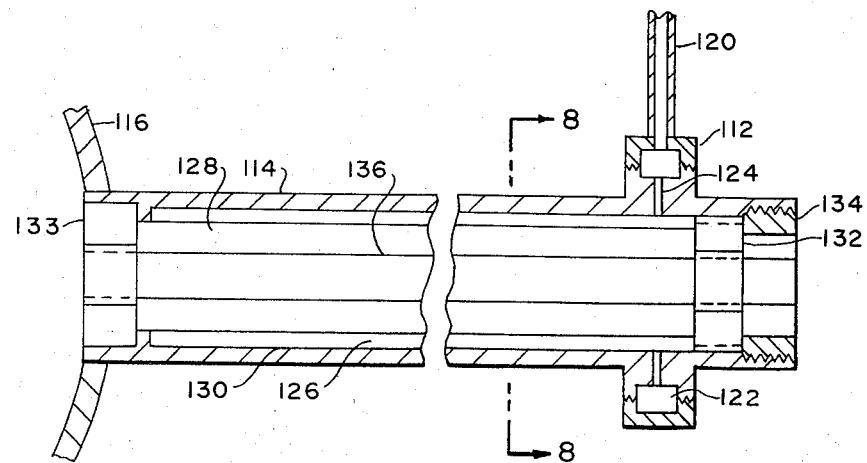
FIG. 7 is an enlarged fragmentary longitudinal sectional view showing the evaporative type fuel mixing chamber assembly employed in the engine.
Figure 8:
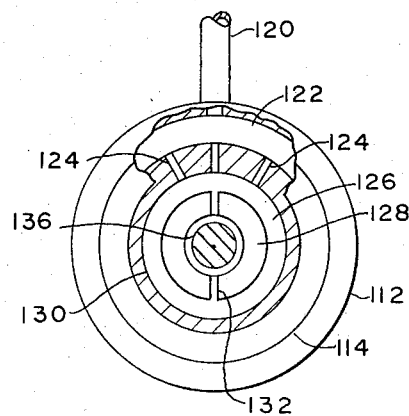
FIG. 8 is a sectional view along lines 8-8 of FIG. 7.

As can best be seen in FIG. 2, combustion system 18 basically includes a fuel manifold 112, an evaporative type fuel mixing chamber 114 and a combustion chamber 116, all rigidly positioned within combustion chamber housing 118. Fuel manifold 112 (FIGS. 7 and 8) is supplied pressurized fuel from fuel line 120. The fuel is fed through line 120 into an annular passageway 122 extending around manifold 112 and a plurality of spaced openings 124 feed fuel between passageway 122 to porous liner 126. Porous liner 126 is typically constructed of a metallic or ceramic material which saturates and distributes fuel throughout its entire length by the process of capillary action and viscous forces of the fuel supplied. This distribution occurs in a manner which prevents droplets of fuel from entering the air-fuel flow passage 128 which is enclosed by porous liner 126. Porous liner 126 is positioned in a recess 130 machined in cylindrical mixing chamber 114 and is held in place by aft center body support 132 which is in turn held in place by retainer ring 134, the latter being threaded into mixing chamber 114. Center body 136, which is a solid cylindrical rod concentric with mixing tube or chamber 114, is held laterally in place on one end by aft center body support 132 and is held both laterally and axially in place by forward center body support 133, which in turn is rigidly attached to mixing chamber 114. Center body 136 and porous liner 126 form the cylindrical air-fuel passage 128 in mixing chamber 114 through which suitable portion of the compressed air from flow control throttle valve assembly 16 is made to pass and enable the production of the combustion mixture.

Combustion chamber 116 is rigidly attached to the forward end of the mixing chamber 114 and the combustion chamber housing 118. The combustible mixture from mixing chamber 114 flows into the combustion chamber where it is ignited. Holes 137 (refer to FIG. 2) positioned about the combustion region 137a, supply a controlled amount of air into the combustion chamber 116 to support combustion. Slots 138 positioned about post combustion region 138a enable the passage into the combustion chamber 116, the remainder of the air, from the flow control throttle valve 16, which cools the gases sufficiently for handling by rotary valve 22 and expander 24.

FUEL CONTROL

The amount of fuel supplied from fuel line 139 to evaporative type fuel mixing chamber 114 is controlled by fuel flow control servo valve 140 of fuel throttle assembly 20. Fuel flow control servo valve 140 is in turn controlled by fuel flow control 142 as follows. Combustion chamber temperature sensor 144, positioned in or at the left end of combustion chamber housing 118, provides a signal to fuel control 142 which is a direct indication of the temperature of the gases exiting from combustion chamber 116. Fuel flow control 142 then compares this signal with a signal representative of a desired combustion products temperature and if the temperature at sensor 144 is above the desired temperature, fuel flow control 142 sends a signal to servo valve 140 to reduce or close the valve and thus restrict or halt the fuel flow to evaporative type fuel mixing chamber 114. This, of course, results in a decrease in the temperature of the combustion gases. When the decrease in temperature is sufficiently lowered, fuel flow control 140 operates servo valve 140 to turn on or increase fuel flow to fuel mixing chamber 114. By this system, the temperature of the combustion gases supplied to rotary valve 22 and expander 24 is held quite constant for all engine speeds and power level settings.

EXPANDER ROTARY VALVE ASSEMBLY

Combustion gases flow from combustion chamber 116 into rotary valve assembly 22. The latter basically consists of a cylindrical tube 150 closed on one end 152 and rotatably mounted on bearings 154 and 156. It is driven by driven gear 158 which is rigidly attached to the closed end 152 of tube 150, driven gear 158 being driven by idler gear 160 which is in turn driven by drive gear 162 on shaft 26. Idler gear 160 is supported by bearing 164 in the end wall of expander housing 166. Driven gear 158, idler gear 160 and driving gear 162 are so sized that the rotational rate of tube 150 of rotary valve assembly 22 is the same as the rotational rate of shaft 26 and therefore the same as the rotational rate of expander rotary lobes 48 and compressor lobes 34. Six rectangular slots 170 are located at equal angular intervals around the circumference of cylindrical tube 150 such that one rectangular slot 170 is over one of the six expander intake ports 172 at all times. The width and length of rectangular slots 170 and their placement around the circumference of cylindrical tube 150 is such as required to meet the following two conditions. The first condition is that the flow of combustion gases from rotary valve assembly 22 is at a substantially constant rate. The second condition is that the leading edge of a rectangular slot 170 arrives over its respective expander intake port 172 at such time as to provide combustion gases in an expander annular space at the same time that an expander rotary lobe tip 176 (FIG. 5) passes the side of the recess 178 for the expander flow restricting flap 180 which is opposite the side in which flap supporting pin 182 is mounted. Further, this should occur at such time as a trailing edge of a previous rectangular slot 170 has moved past an intake port 172. Still further this is to occur after a previous expander rotary lobe tip 176 has rotated sufficiently that a charge of combustion gases is trapped in that part 184 of expander annular space 185 between flow restricting flap 180, clockwise to expander rotary lobe tip 176 so that there will occur expansion close to atmospheric pressure on or slightly before rotary lobe tip 176 rotates to expander exhaust port 186. In this fashion the present invention clearly achieves an improved thermal efficiency.

Escape of combustion gases from a rectangular slot 170 of valve tube 150 in any positon other than when over an expander intake port 172 is prevented by rotary valve seal 188 which seals against the rotating surface of valve tube 150. The open end 190 of tube 150 is rotatably connected to combustion chamber 116 at rotating joint 192 and incorporates a suitable seal, not shown, which prevents escape of combustion gases. Rotary valve assembly 22, rotary valve seal 188, rotary valve bearings 154 and 156, rotating joint 192 and gears 158, 160 and 162 are completely enclosed in valve and gear housing 194 as shown in FIG. 2.

ROTARY EXPANDER

Figure 5:
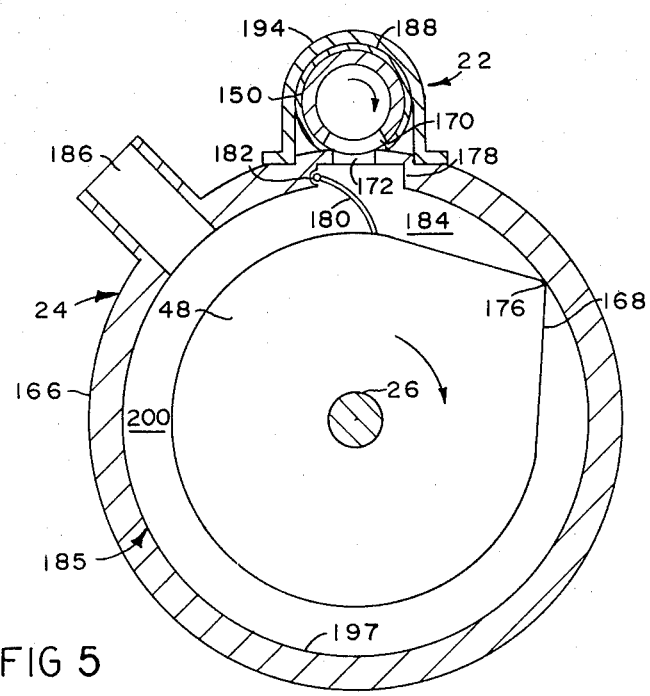
FIG. 5 is a sectional view along the lines 5—5 of FIG. 2 showing one of the expander stages of the invention.

Referring to FIGS. 2, 3 and 5, rotary expander 24, which has been partially described above, is housed in stationary expander housing 166 concentric with and side-by-side with compressor 12. Expander 24 is a six-stage positive displacement expander, one stage of which is particularly illustrated in FIG. 5. Bearings 196 rotatably support shaft 26 which is common to both rotary compressor 12 and rotary expander 24. Each of rotary lobes 48 are positioned such that the lobe tips 176 are equally spaced around the inner cylindrical wall 197 of expander housing 166. Five internal expander housing partitions 198 (FIG. 2) form six cylindrical cavities 199 in which the six expander rotary lobes 48 rotate. Each annular space 185 has a single intake port 172 and a single exhaust port 186. Each expander rotary lobe tip 176 seals against wall 197 of annular space 185 and in cooperation with flow restricting flap 180 separates each expander annular space 185 into two regions 184 and 200 for the greater portion of travel of the expander lobe through one revolution of rotation. Thus there appears an expansion region 184 from flow restricting flap 180 clockwise to lobe tip 176 and an exhaust region 200 from lobe tip 176 clockwise around to flap 180. There is one flow restricting flap 180 for each expander annular space 185. Each flow restricting flap 180 is rotatably mounted on pin 182 in such a manner as to allow the flow restricting flap to be cammed into a recess 178 in expander housing 166 by the sides of each expander rotary lobe 168 as the tip of that lobe passes its associated flow restricting flap 180.

OPERATION OF THE ENGINE

Referring initially to FIG. 2, shaft 26 is cranked, by means not shown, in a clockwise direction (FIGS. 2-5) and servo valve 140 is operated to enable fuel flow from fuel line 139 into fuel mixing chamber 114. The lobes 34 of compressor 12 are rotated clockwise producing a flow of air in through ports 38 and out through ports 40 into air duct 14 pressurizing the latter. Air is thus caused to flow through air flow duct 14 and air flow control throttle valve assembly 16 into evaporative fuel mixing chamber 114 and a mixture of fuel and air flows into combustion chamber 116. A suitable source of electrical energy, not shown, ignites the fuel air mixture by an igniter, not shown, in combustion chamber 116. Sufficient air is added through holes 137 to the burning gases to complete combustion in primary combustion region 137a. The combustion products are then mixed with added or excess air supplied through slots 138 to provide a high air to fuel ratio which minimizes the production of combustion product pollutants and at the same time reduces the temperature of the combustion products to a temperature suitable for introduction of the gases through rotary valve assembly 22 to expander 24 without damage to the materials of these components. Combustion is greatly enhanced by the introduction of the fuel into combustion chamber 116 in a completely vaporized form as a result of the evaporative type fuel mixing chamber employed. The result is that there is produced a combustion gas at substantially the same pressure as that supplied by fuel flow control throttling valve assembly 16 but at an elevated temperature. As will be readily appreciated, the pressure, elevated temperature and resulting reduction in density gives the combustion gases the ability to produce more work upon expansion in the expander annular spaces 174 against expander rotary lobes 34 than required to compress gases in the compressor annular spaces 36, and thereby there is produced a substantial quantity of useful work as an output of shaft 26.

SUMMARY OF ACCOMPLISHMENTS

Fundamentally, the applicant has provided a new concept in rotary engine design by the invention of a positive displacement rotary engine operating on the Air Standard Brayton Cycle. The engine is of simple and sound construction and can be readily and economically fabricated and assembled on a mass production basis. The engine is capable of good combustion efficiency which results in low pollution emission in the engine exhaust.

The engine features a discrete combustion chamber and multistage, positive displacement compressors and expanders to provide essentially continuous, smooth, quiet and even power output.

A further feature of this invention is that it provides an improved positive displacement rotary compressor, the displacement of which may be continuously varied over a specified range in such a manner as to provide a continuous range of pressures and flow rates of air as required by the engine or other applications to attain a continuous range of mechanical power from the engine for all rotational speeds.

A still further feature of this invention is that it provides an evaporative type fuel mixing chamber to which fuel and air are supplied in such a manner as to provide a fuel-air vapor combustible mixture suitable for combustion in the combustion chamber which combines extremely high efficiency combustion with low pollution emissions.

A still further feature of the invention is that it provides a means of controlling the mechanical power from the engine by means of a simple flow control valve which restricts the flow of air from the compressor to combustion chamber with the degree of restriction imposed by the valve being controlled through a readily controllable mechanical linkage to the engine. The air supplied conforms to the degree of restriction via a relatively constant pressure output of the compressor.

A still further feature of the invention is that it provides a rotary valve assembly in conjunction with and between a combustion chamber and rotary expander capable of supplying combustion products to the expander chambers in a highly efficient manner and distributes the flow to the several expansion chambers of the expander in such a way as to result in a substantially continuous flow of combustion products from the combustion chamber.

Finally, the present invention presents a new form of rotary internal combustion engine which it is believed will provide that ideal combination of high torque and smooth power over a wide range of operating speeds and power level settings making it particularly suitable for automotive vehicles, ships and aircraft and generally applicable to most other rotary power requirements.

What is claimed is:
1. A rotary engine comprising:
   air compression means adapted to provide a substantially continuous flow of compressed air;
   fuel mixing means responsive to the output of said compression means for mixing fuel with air and providing a fuel-air vapor;
   combustion chamber for receiving said fuel-air vapor under pressure from said mixing means and burning the fuel-air vapor mixture;
   positive displacement, sequentially operable, multi-stage rotary expander
   valve means for receiving an expanding gas output of said combustion chamber and sequentially directing flow of said gas into each of the several stages of said multi-stage expander; and
   drive means responsive to a rotary output of said rotary expander for driving said compression means and providing rotary shaft output power.
2. A rotary engine as set forth in claim 1 wherein each said stage of said expander comprises:
   an expander body having a cylindrical cavity;
   a rotor having an eccentric lobe and a lobe tip adapted to seal against the inner surface of said last named cylindrical cavity and to provide an annular space interrupted by the tip of said last named lobe;

an exhaust outlet and intake port, coupled to said valve means, closely spaced but separated about said last named cavity in the order of rotation; and a flow restricting flap supported by said expander body in the region between said closely spaced outlet and inlet ports and adapted to provide a seal of said annular cavity between said exhaust port and inlet port.
3. A rotary engine as set forth in claim 1 wherein said valve means comprises a cylindrical tube rotatably driven by said rotary expander, said tube being open at one end to receive expanding gases from said combustion chamber and having a plurality of axially and circumferentially spaced ports adapted to sequentially supply said gases to discrete stages of said expander.

4. A rotary engine as set forth in claim 1 wherein said fuel mixing means comprises a surface of a perforated and fuel saturated member positioned adjacent a flow of air positioned along an air stream between said compression means and said combustion chamber.

5. A rotary engine as set forth in claim 1 further comprising flow control means for controllably regulating the flow of compressed air from said air compression means to said fuel mixing means for controlling the speed of said engine.

6. A rotary engine as set forth in claim 5 wherein said flow control means comprises:

first and second, a first pair, of rectangular, oppositely positioned, plates and each plate including first mounting means for pivotally mounting a plate along a first edge and second mounting means for pivotal connection along a second, opposite, edge;

third and fourth; a second pair, of oppositely positioned plates and including third mounting means for pivotal connection along a first edge of each of the second pair of plates and fourth mounting means for pivotal connection along a second, opposite, edge, of each of said second pair of plates;

first pivotal coupling means for pivotally interconnecting a second said first plate to a first edge of said third plate and second pivotal coupling means for pivotally interconnecting a second edge of said second plate to a first edge of said fourth plate;

control means pivotally connected to said second edges of said third and fourth plates and including means for varying the distance between the plate edges coupled by said first and second pivotal coupling means;

whereby an adjustable passageway for said flow is achieved.

7. A rotary engine as set forth in claim 1 wherein said air compression means comprises a multi-stage, positive displacement, compressor.

8. A rotary engine as set forth in claim 7 wherein each said compressor stage comprises:

a compressor body having a cylindrical cavity;

a rotor having an eccentric lobe having a tip adapted to seal against inner surfaces of said cavity and providing an annular space interrupted by the tip of the lobe;

a compressed air outlet and air inlet closely spaced but separated about said cavity in the order of rotation;

a flow restricting flap supported by said compressor body in the region between said closely spaced outlet and inlet and means responsive to the outlet, pressure of said compression means for operating said flap to provide a seal of said annular cavity in said region when the output pressure of said compression means is less than a predetermined pressure and unseal said region of said annular cavity when said pressure is greater than said predetermined pressure.

* * * * *